United States Patent Office 3,846,245
Patented Nov. 5, 1974

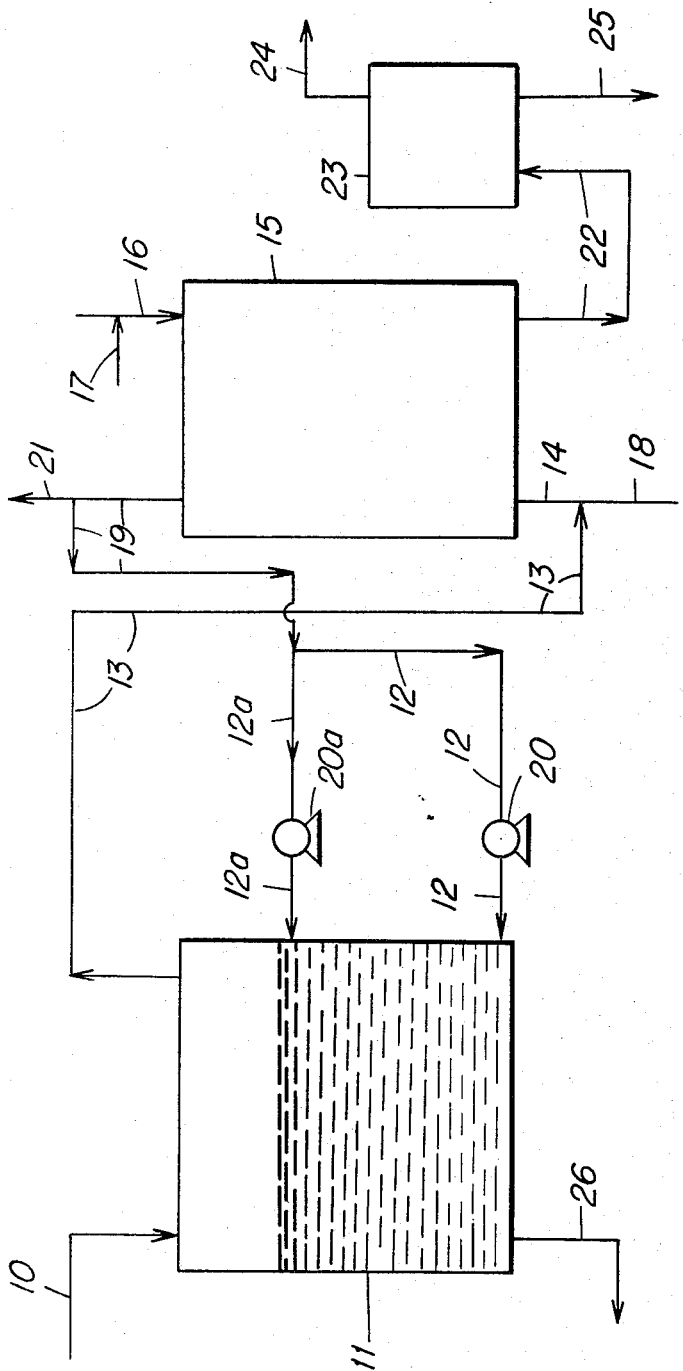

3,846,245
PROCESS FOR GROWING MICROORGANISMS
WITH LOW PRESSURE AIR
Edward F. Kondis and John W. Payne, Woodbury, N.J.,
assignors to Mobil Oil Corporation
Continuation-in-part of abandoned application Ser. No.
859,940, Sept. 22, 1969. This application Dec. 14, 1971,
Ser. No. 207,788
Int. Cl. C12b 1/00
U.S. Cl. 195—109          15 Claims

ABSTRACT OF THE DISCLOSURE

This specification discloses a process for growing aerobic microorganisms in a culture medium employing a low pressure, oxygen-containing gas. A minor portion of the gas is injected into a lower portion of the culture medium to supply oxygen for growth of the microorganisms and to effect agitation of the culture medium. A major portion of the gas is injected into an upper portion of the culture medium to remove heat from the culture medium.

CROSS REFERENCE TO RELATED APPLICATIONS

This application is a continuation-in-part of our copending application Ser. No. 859,940, filed Sept. 22, 1969 and now abandoned.

BACKGROUND OF THE INVENTION

Field of the Invention

This invention relates to a process for growing aerobic microorganisms in a culture medium wherein an oxygen-containing gas is injected into the culture medium.

Description of the Prior Art

It is conventional to grow aerobic microorganisms in a culture medium and to inject air into the culture medium. Generally, the air employed for the growth of the microorganisms has been injected into the culture medium at a high pressure. Further, as shown in U.S. Pat. No. 3,201,327, growth of microorganisms has been effected by contacting a spray of culture medium with a stream of oxygen-containing gas above the surface of the culture medium while an additional source of oxygen may be fed into the fermenter below the surface of the culture medium.

SUMMARY OF THE INVENTION

The invention comprises growing microorganisms by incubating them in a culture medium comprising an aqueous mineral nutrient solution and a source of carbon for energy and growth. An oxygen-containing gas is injected into the culture medium to supply oxygen for growth of the microorganisms and to effect agitation and evaporative cooling of the culture medium. A minor portion of the gas is injected into the culture medium at the lower portion thereof at a pressure at the point of injection at least sufficient to overcome the hydrostatic pressure of the culture medium at the point of injection. A major portion of the gas is injected into the culture medium at the upper portion thereof at a pressure at the point of injection at least sufficient to overcome the hydrostatic pressure of the culture medium at the point of injection. Preferably, the pressure of the gas injected into the upper portion of the culture medium is, at the point of injection, at least 0.5 pound per square inch gauge (p.s.i.g.) lower than the pressure of the gas injected into the lower portion of the culture medium at the point of injection.

BRIEF DESCRIPTION OF THE DRAWING

The drawing is a schematic flow diagram illustrating a preferred embodiment of the invention.

DESCRIPTION OF THE PREFERRED EMBODIMENTS

Growing aerobic microorganisms is of importance in view of the ability of many species to produce valuable products, such as intracellular protein which can be employed as feed for cattle and other animals, including humans. Growth of these microorganisms has been effected in a culture medium comprising an aqueous mineral nutrient solution and a carbon-containing substrate into which an oxygen-containing gas is injected. The aqueous mineral nutrient solution provides water and minerals required for growth of the microorganisms, the carbon-containing substrate provides carbon for energy and growth of the microorganisms, and the gas provides oxygen essential for growth of the aerobic microorganisms. Effective growth of the microorganisms necessitates agitation of the culture medium in order that the aqueous mineral nutrient solution, the substrate, and the oxygen be made readily available to the microorganisms. Agitation may be effected by means of mechanical devices, such as paddles, stirrers, or propellers, by injection of the oxygen-containing gas, or by a combination of both. The growth of the microorganisms is an exothermic reaction, the degree thereof depending upon the substrate. Since the microorganisms will grow only within restricted temperature ranges, and at satisfactorily rapid rates within still more restricted selected temperature ranges, temperature control of the culture medium by cooling is required. Cooling of the culture medium can be effected by the use of a refrigerant, as a result of evaporative cooling by the oxygen-containing gas injected into the culture medium, or by a combination of both.

The production of a protein product by growth of microorganisms is in competition with other procedures for production of protein. Particularly, it is in competition with the growth of vegetable protein. Because of this competition, in order for the production of a protein product by the growth of microorganisms to be economically feasible, the cost of growing the microorganisms must be maintained at a minimum. One of the more significant costs in growing microorganisms is that of the energy involved in providing agitation and cooling of the culture medium. By the process of the invention, agitation and cooling of the culture medium are effected with a reduced expenditure of energy.

Economy of production of protein product by the invention is obtained as a result of injecting the oxygen-containing gas into the culture medium at a plurality of depths. A minor portion of this gas is injected into the lower portion of the culture medium. The primary function of this portion of the gas is to provide agitation of the culture medium and the oxygen for the growth of the microorganisms. It also effects some evaporative cooling of the culture medium. The major portion of the gas is injected into the upper portion of the culture medium. The primary function of this portion of the gas is to provide evaporative cooling of the culture medium. It also effects some agitation of the culture medium and any oxygen it supplies for growth of the microorganisms will be incidental. The amount of gas required for evaporative cooling of the culture medium is greatly in excess of that required for agitation of the culture medium and for supplying oxygen for growth of the microorganisms. Further, the energy required to inject the gas into the culture medium depends upon the pressure required for injection and a greater pressure is required where the point of injection is lower in the culture medium than where the point of injection is higher in the culture medium. On the other hand, in order to effect satisfactory agitation, the gas must be injected into the lower portion of the culture medium. Thus, by injecting only the gas required for agitation, which is a minor portion of the total gas required, into the lower portion of the culture medium, and by injecting the gas required for evaporative cooling, which is a major portion of the total gas required, into the upper portion of the culture medium, the major portion of the gas is injected at a lower pressure than the minor portion of the gas. As a result, the energy requirements, and the cost thereof, are reduced to the extent of the proportion of the total gas injected into the upper portion of the culture medium.

The present invention may be employed for the growth of many genera of aerobic microorganisms. Further, in the present invention, many different substrates can be used to provide assimilable carbon for energy and growth of the microorganisms. However, it is preferred to grow hydrocarbon-utilizing microorganisms and to use hydrocarbons as the substrate for the source of carbon. The culture medium thus comprises the microorganism cells, a hydrocarbon, and an aqueous mineral nutrient solution.

The culture medium is in the form of an emulsion. This emulsion may be, for example, a water-in-oil emulsion, by which is meant an oil phase-continuous emulsion where the oil is a hydrocarbon. The culture medium may also be in the form of an oil-in-water emulsion, by which is meant a water phase-continuous emulsion.

The microorganism which may be grown by the process of the invention include bacteria, fungi, yeasts, and molds. Non-fastidious organisms are preferred, i.e., those which will grow in simplified aqueous mineral nutrient solutions without necessity for addition of organic compounds. Species which are active animal or human pathogens would normally be excluded, although, if, for any reason, it is desired to grow them, it can be done by the process of the invention. Thus, where the objective is to grow microorganisms for non-food purposes, the invention is of use for growing pathogenic microorganisms.

Of the bacteria, suitable genera include Pseudomonas, Bacillus, Flavobacterium, Sarcina, etc. Illustrative species of these genera are *P. aeruginosa, P. oleovorans, P. putida, P. boreopolis, P. methanica, P. fluorescens, P. pyocyanea; B. aureus, B. acidi, B. subtilis, B. urici, B. cereus, B. coagulans, B. mycoides, B. circulans, B. megaterium; Flabobacterium aquatile; Sarcina alba,* and *Sarcina luteum.*

Other preferred genera are Achromobacter and Nocardia, as illustrated by species such as *A. xerosis, A. agile, A. gutatus, A. superficialis, A. parvulus, A. cycloclastes; N. salmonicolor, N. asteroides, N. minimus, N. opaca, N. corallina, N. rubra, and N. paraffinae.* The genus Mycobacterium is useful, particularly such species as *M. paraffinicum, M. phlei, M. lacticola, M. rhodochrous, M. smegmatic, M. rubrum, M. luteum, M. album,* and *M. byalinicum.*

Still other hydrocarbon-utilizing bacteria are *Methanomonas methanica* and *Methanomonas sp.; Micrococcus paraffinae; B. aliphaticum, B. hidium* and *B. benzoli* from the genus bacterium; and species of Micromonospora. Other useful genera include Brevibacterium, Aerobacter, and Corynebacterium.

Of the fungi, the process is applicable to any fungus within the classification Eumycetes or true fungi, but preferably those from the class Fungi Imperfecti or from the class Phycomycetes. Preferred fungi from the class Fungi Imperfecti are species of the general Aspergillus and Penicillium, as illustrated by *A. niger, A. glaucus, A. oryzae, A. flabus, A. Terreus, A. itaconicus; P. notatum, P. chrysogenum, P. glaucum, P. griseolfulvum, P. expansum, P. digitatum,* and *P. italicum.* Other suitable organisms include various species of the genera Monilia, Helminthosporium, Alternaria, Fusarium, and Myrothecium. Preferred fungi of the class Phycomycetes include species from the genera Rhizopus and Micor, such as *R. nigricans, R. oryzae, R. delemar, R. arrhizus, R. stolonifer, R. sp.; M. mucedo,* and *M. genevensis.*

Some of the foregoing genera of fungi are also characterized as molds, such as Aspergillus, Penicillium, Rhizopus, and Micor, but it will be understood that all are true fungi or Eumycetes.

Of the yeasts, the preferred organisms are of the family Cryptococcaccae, and particularly of the sub-family Cryptococcoidae. Preferred genera are Torulopsis (or Torula), Candida and Pichia. Preferred species are *Candida lipolytica, Candida pulcherrima, Candida utilis, Candida utilis Variati major, Candida tropicallis, Candida intermedia,* and *Torulopsis colliculosa.* Other useful species are *Hansemula anomala, Oidium lactia,* and *Neurospora sitophila.*

The hydrocarbon is one that is in the liquid phase at incubation temperature so as to be able to form an emulsion. Aliphatic hydrocarbons are preferred, and they may be saturated or unsaturated, straight or branched chain hydrocarbons having up to 20 or 30 or 40 or more carbon atoms. Saturated straight chain hydrocarbons having up to 20 carbons, such as n-hexadecane, are particularly desirable. Cyclic hydrocarbons, comprising aromatic and alicyclic compounds, are also of use, including alkyl-substituted cyclic compounds having 1, 2, or more akyl substituents each of any suitable length, chain configuration, and degree of saturation, and in which the cyclic moiety is aromatic or cycloparaffinic. Alkyl-substituted aromatic hydrocarbons include toluene, the various xylenes, mesitylene, ethylbenzene, p-cymene, the diethylbenzenes, and the isomeric propylbenzenes, butylbenzenes, amylbenzenes, heptylbenzenes, and octylbenzenes. Among the useful alkyl-substituted cycloparaffins are methylcyclopentane, and di- and trimethylcyclopentanes, ethylcyclopentane, and diethylcyclopentanes, the various propyl-, butyl-, amyl-, hexyl-, and octylcyclopentanes. Also the alkylcyclohexanes, which are substituted in a manner corresponding to the foregoing alkylcyclopentanes, and further including such compounds as the various tetramethylcyclohexanes, methylethylcyclohexanes, methylpropylcyclohexanes, and the like, may be employed.

Crude oils, various petroleum fractions, residua and the like, are of use.

Other carbon-containing substrates can be used, typical of which are carbohydrates, sugars, cellulose, alcohols, and lignins.

It will be appreciated that the hydrocarbon substrate can be in the liquid phase not only by having a suitable melting point but also by being dissolved in a suitable solvent. The hydrocarbons contemplated in the preceding paragraphs are those which are normally liquid at incubation temperature. However, normally solid hydrocarbons can be used as the source of carbon by dissolving them in a hydrocarbon solvent or in any other conventional inert non-toxic solvent.

The aqueous mineral nutrient solution contains a source of nitrogen such as a nitrate or nitrite or an ammonium salt or urea, and such ions as potassium, magnesium, phosphate, and sulfate, as well as ions of trace elements like molybdenum and cobalt. Traces of manganese, iron, and calcium can also be present. As water is included in the nutrient solution, most of these ions will usually be present in sufficient quantity in ordinary potable water supplies. However, it is desirable to add the ions to the nutrient solution to insure their presence in sufficient quantity for growth. Usually the nutrient solution consists primarily of water, which can constitute 99%, or more, by weight of the nutrient solution, although it can also constitute a lesser portion, going down to 90% thereof. Generally any proportion of water heretofore employed in microbial growth can be used. Suitable mineral nutrient solutions are as follows, the components being given in grams per liter of solution:

TABLE I

| | |
|---|---|
| Potassium monohydrogen phosphate | 6.0 |
| Sodium dihydrogen phosphate | 9.0 |
| Sodium molybdate | .006 |
| Cobaltic chloride | .006 |
| Magnesium sulfate | .6 |
| Ammonium sulfate | 6.0 |

Another suitable mineral salts nutrient is as follows:

TABLE II

| | |
|---|---|
| Sodium monohydrogen phosphate | 9 |
| Potassium dihydrogen phosphate | 6 |
| Ammonium sulfate | 6 |
| Magnesium sulfate | 0.6 |
| Sodium carbonate | .3 |
| Calcium chloride | 0.03 |
| Ferrous sulfate | 0.015 |
| Manganese sulfate | .006 |
| Cobalt chloride | .006 |
| Sodium molybdate | .006 |

Referring to the culture medium, it can be, as mentioned previously, in the form of an oil-in-water emulsion or in the form of a water-in-oil emulsion. The emulsion, whatever its form, can be prepared and maintained by means of gas agitation alone or, as is preferable, by means of such agitation together with the use of an emulsifying agent, i.e., an oil-soluble agent for a water-in-oil emulsion and a water-soluble agent for an oil-in-water emulsion. The emulsifying agent may be of ionic or non-ionic character. The proportions of the aqueous mineral nutrient solution and the hydrocarbon substrate are such as to provide, as known in the art, the water-in-oil emulsion or oil-in-water emulsion. Suitably, the emulsion may comprise between 35 and 90% or more of the hydrocarbon substrate, the balance being the aqueous mineral nutrient solution, on a volume basis. The emulsion may be conveniently formed within the fermenter although it is also feasible to prepare it by means of a conventional homogenizer and then add it to the fermenter.

With the oxygen-containing gas being injected into the culture medium during growth of the microorganism, oxygen is transferred from the gas bubbled through the emulsion at a rate, under equilibrium conditions, proportional to its solubility in the emulsion, which ranges from about 6 parts per million in the water phase to 80 parts per million, by weight, in the hydrocarbon phase.

Of the oxygen-containing gas injected into the culture medium, the minor portion thereof, as previously stated, is injected into the culture medium at the lower portion. By "lower portion" is meant that portion of the culure medium below the mid-point of the culture medium when in a quiescent state. This portion of the oxygen-containing gas, also as previously stated, functions primarily to provide agitation of the culture medium. The deeper the oxygen-containing gas is injected into the culture medium, the more effective is the agitation. Thus, it is preferred to inject this minor portion of the gas at as low a point in the culture medium as possible. The minor portion of the gas, for example, may be injected into the culture medium at a point proximate to the bottom of the culture medium. Further, for example, the point of injection may be at the very bottom of the culture medium. By "minor portion" of the gas is meant not more than 49% by volume of the total amount of the gas, i.e., the minor portion plus the major portion of the gas, injected into the culture medium. Preferably, the minor portion of the gas constitutes about 5% by volume of the total amount of the gas injected into the culture medium.

Of the oxygen-containing gas injected into the culture medium, the major portion thereof is injected into the upper portion of the culture medium. By "upper portion" is meant that portion of the culture medium above the mid-point of the culture medium when in a quiescent state but below the surface of the culture medium. By "major portion" is meant at least 51% by volume of the total amount of the gas injected into the culture medium. Preferably, the major portion of the gas constitutes about 95% by volume of the total amount of the gas injected into the culture medium.

The energy required to inject the major portion of the gas becomes less with decreasing depth of the culture medium at the point of injection. Thus, it is preferred to inject the major portion of the gas as close to the surface of the culture medium as possible. For example, the major portion of the gas may be injected at a point just below the surface of the culture medium. Effective cooling of the culture medium is obtained where the major portion of the gas is injected at a depth of 1 inch below the surface thereof. However, the depth of injection may be up to 6 inches below the surface of the culture medium. The depths of injection may even be greater provided they are not below the mid-point of the culture medium when in a quiescent state.

The oxygen-containing gas injected into the upper portion of the culture medium may be at any suitable temperature and pressure that will effect evaporative cooling of the culture medium. Preferably, the temperature of the injected oxygen-containing gas is below the temperature of the culture medium. However, the temperature of this oxygen-containing gas may be above the temperature of the culture medium, provided, however, that its water content is such that the gas, upon attaining the temperature of the culture medium, will be undersaturated with water and will thus be able to evaporate water from the culture medium. Similarly, the oxygen-containing gas may be saturated with water, provided, however, that its temperature is sufficiently below the temperature of the culture medium that the gas, upon attaining the temperature of the culture medium, will be undersaturated with water. Preferably, the temperature of the gas is below the temperature of the culture medium and is undersaturated with water at this temperature. The temperature of the gas may be between 32° and 80° F.

The oxygen-containing gas is injected, as mentioned, into the culture medium at a pressure at least sufficient to overcome the hydrostatic pressure of the culture medium at the point of injection. By "pressure of the injected gas" is meant the pressure of the gas immediately prior to injection of the gas into the culture medium, i.e., the pressure of the gas in the line providing the gas to the injector whether a sparger or otherwise. The pressure of the injected gas may be above the hydrostatic pressure of the culture medium at the point of injection. However, ordinarily, use of pressures above the hydrostatic pressure represents a waste of energy.

The pressure of the major portion of the gas is, at the point of injection, at least 0.5 p.s.i.g. less than the pressure of the major portion of the gas at the point of injection. With any differential in pressure between the upper and lower portions of the gas, a saving in energy is obtained. With a pressure differential of at least 0.5 p.s.i.g., an effective saving in energy is obtained. With a greater pressure differential, greater savings are obtained. It is preferred that the pressure differential be at least 5 p.s.i.g. Further, it is preferred the pressure of the major portion of the gas at the point of injection be not greater than 5 p.s.i.g. With pressures greater than 5 p.s.i.g., economies in the cost of the energy to supply this portion of the gas undesirably decrease. Further, at lower pressures, significant investment economies are obtained since lower cost blowers, as compared to higher cost compressors, can be employed to inject the gas. It is also preferred that the pressure of the minor portion of the gas at the point of injection be not greater than 30 p.s.i.g. With pressures greater than 30 p.s.i.g., the cost of the energy to supply this portion of the gas undesirably increases. It follows from the foregoing that it is preferred that the major and minor portions of the gas are injected into the culture medium where the hydrostatic pressures at the point of injection are not in excess of 5 p.s.i.g. and 30 p.s.i.g., respectively.

By "oxygen-containing gas" is meant any gas containing free oxygen available for growth of the microorganisms and which does not contain a component or components which are significantly inhibiting to the growth of the microorganisms. Air is the preferred oxygen-containing gas. However, an oxygen-enriched gas, such as oxygen-enriched air, may be employed. Further, pure oxygen may be employed. However, since the oxygen supplied by the major portion of the gas is incidental to that required for growth of the microorganisms, the use of oxygen-enriched air or other gas or pure oxygen will ordinarily represent a waste of oxygen. Air partially depleted of its oxygen content may also be used for the major, and also for the minor, portion of the gas. Thus, the gaseous effluent from the culture medium may, after suitable treatment to reduce its temperature, its water content, or both, be recycled to the culture medium as the oxygen-containing gas.

The major portion and the minor portion of the oxygen-containing gas may be injected at one depth only in the upper portion and the lower portion, respectively, of the culture medium. However, each of the portions of the oxygen-containing gas may be injected at a plurality of depths in the culture medium. Thus, the major portion of the gas may be injected at two or more depths in the upper portion of the culture medium. Similarly, the minor portion of the gas may be injected at two or more depths in the lower portion of the culture medium.

Referring now to the drawing, there is shown a process for the production of 60,000 tons of protein per year from n-alkanes. The heat of reaction is about 22,000 British Thermal Units (B.t.u.) per pound of protein or 13,000 B.t.u. per pound of hydrocarbon consumed. In the fermenter, oxygen-containing gas is used to supply oxygen, provide agitation, and to remove the heat of reaction by evaporative cooling. The driving force for the evaporative cooling is proportional to the difference in water content between exit and entrance gas streams. The gas is introduced into the fermenter through multiple inlets simultaneously at a depth varying from slightly below the liquid surface to the bottom of the fermenter vessel. The fermenter vessel can be any convenient height, preferably between 2 to 30 feet. The gas can be introduced through spargers or pipes to effect the necessary oxygen transfer, cooling, and liquid circulation.

In the drawing, the entering gas stream has a wet bulb temperature of 72° F. and the exit gas stream is essentially saturated with water at 98° F. (fermenter operating temperature). Under these conditions, each pound of gas passing through the fermenter will evaporate 0.024 pound of water, thus removing about 24 B.t.u. of heat by evaporation and about 6 B.t.u. as sensible heat. The exit gas from the fermenter can be passed up through a conventional cooling tower and recycled to the fermenter or vented. Fresh air or air from product dryers in the amount of the vented gas is used as makeup.

Referring now in detail to the drawing, fermenter 11 having a capacity of 2.76 million (MM) gallons, is charged initially with 41,500 gallons of n-hexadecane. The balance of the charge comprise aqueous mineral nutrient solution as described in Table I. The fermenter contents are inoculated with Pichia yeast. The fermenter contents have a pH of about 3.5. Liquid feed in line 10 is charged at the rate of about 4600 gallons per minute (g.p.m.) to fermenter 11. The liquid feed comprises n-hexadecane and nutrient solution preferably to maintain the same proportions as in the original charge to the fermenter. The liquid feed in line 10 need not, but can, contain Pichia yeast.

The contents of fermenter 11 are originally heated to about 98° F. Oxygen-containing gas at a pressure sufficient to overcome the hydrostatic pressure of the fermenter contents is passed into fermenter 11 from line 12 at a rate of about 0.13 million standard cubic feet per minute (MM s.c.f./min.) proximate the bottom of fermenter 11, and from line 12a at a rate of about 2.33 MM s.c.f./min. below and proximate the surface of the fermenter liquid content. The gas from line 12a can be injected about 1 inch below the surface of said liquid content, and from line 12 about 2 inches above the bottom of the fermenter. The gas in line 12a is at a pressure at least sufficient to overcome the hydrostatic pressure of the fermenter contents. There will be a pressure differential between the gas in lines 12 and 12a of at least 0.5 p.s.i.g. The gas is saturated with water at about 72° F. In general, the temperature of the gas in lines 12 and 12a can range from 32° F. to 80° F. The gas in lines 12 and 12a contains about 40 times the stoichiometric amount of oxygen needed for complete consumption of the n-hexadecane.

The gas pressure can be maintained in any conventional way, as by using suitable pre-set, pressure-regulating means (not shown) in lines 12 and 12a.

Gases (primarily $CO_2$) formed in fermenter 11 and unused, injected gas are removed as a gaseous product from fermenter 11 through line 13. The gaseous product is saturated with water at about 98° F.

Gaseous products in line 13 are passed to line 14 and then into a lower portion of tower 15, wherein they are contacted countercurrently with cooling water, at a temperature from 32° F. to 80° F., preferably about 70° F., passed into the tower from inlet line 16. The cooling water temperature can be varied depending upon the incubation temperature in fermenter 11. Thus, with thermophilic microorganisms which can grow at temperature as high as about 120° F., the cooling water temperature can be as high as about 90° F.

The quantity of cooling water charged to tower 15 through line 16 is about 29,700 gallons per minute at 70° F. Relatively small amounts of one or more water treating agents, such as calcium hydroxide and sodium chloride, can be added to the cooling water charge through line 17. If necessary, the water can be sterilized as by chlorination, ozonation, or other chemical methods, to maintain sterility of recycle gas. Conventional sterilization agents can be added via line 17.

Sterile air, 0.13 MM s.c.f./min., is added to line 14 via line 18. This air can be obtained from a drying operation (not shown), wherein air is heated to above the sterilization temperature of air, e.g. 350–500° F., and is then used in the drying of the cell product described below.

Gas which has been scrubbed with water, substantially dehumidified and cooled to about 72° F., is removed overhead through line 19, and is moved by pumps 20 and 20a to lines 12 and 12a, respectively. A portion of the gas in line 19, substantially equal in quantity to the air, about 0.13 MM s.c.f./min., can be vented from the system via line 21.

Cooling water, at about 93° F., is taken from tower 15 through exit line 22 to separator 23 wherein a relatively small amount of n-hexadecane, derived from evaporation in fermenter 11 and condensed in tower 15, forms as an upper layer. A water layer is formed as a bottom layer in separator 23. The n-hexadecane layer is removed from separator 23 through line 24 for recycle to fermenter 11. Water is removed from separator 23 through discharge line 25 at a rate of about 30,400 g.p.m.

Liquid product is removed from fermenter 11 through discharge line 26, at a rate of about 4600 g.p.m. The liquid product containing yeast cells can be subjected to a suitable separation procedure (not shown), such as filtration, centrifugation, settling, drying and the like, in order to recover the yeast cells.

Cell yields equivalent to about 10 grams of dry cells per liter of culture medium are obtained.

By way of illustration, with gas in line 12 at a pressure of about 5 p.s.i.g. and gas in line 12a at about 0.1 p.s.i.g., the power required to charge 0.13 MM s.c.f./min. of gas in line 12 is about 4000 horsepower (H.P.) and to charge 2.33 MM s.c.f./min. via line 12a is about 1500 H.P., for a total of approximately 5500 H.P. In contrast, if all of the gas were injected into fermenter 11 from line 12 at 5 p.s.i.g., the power requirement would be approximately 77,000 H.P. Thus, the plurality injection system of this invention makes possible a pumping investment savings of approximately seven million dollars over a single injection system. In addition, there is an operating cost savings of about $13,000 per day.

It is to be understood that, instead of two gas injection lines (e.g., 12 and 12a in the drawing), a greater number of gas injection lines at various depths can be employed.

We claim:

1. A recycle process for growing an aerobic, hydrocarbon-utilizing microorganism comprising:
    (a) incubating said microorganism in a culture medium comprising an aqueous mineral nutrient solution and a liquid hydrocarbon as a source of carbon for energy and growth of said microorganism, the amount of said liquid hydrocarbon comprising between 35 and 90 percent by volume of said culture medium,
    (b) agitating said culture medium and providing oxygen for the growth of said microorganisms by injecting a minor portion of an oxygen-containing gas into said culture medium at a lower portion thereof at a pressure at least sufficient to overcome the hydrostatic pressure of said culture medium at said point of injection and evaporatively cooling said culture medium by injecting a major portion of an oxygen-containing gas into the upper portion of said culture medium at a pressure sufficient to overcome the hydrostatic pressure of said culture medium at said point of injection,
    (c) growing cells of said microorganism over a period of time,
    (d) removing oxygen-containing gas and gases formed in step (b),
    (e) contacting said oxygen-containing gas and gases of step (d) countercurrently to water at a substantially lower temperature than said gas and gases, and
    (f) recycling said oxygen-containing gas to step (b).

2. The process of claim 1 wherein said minor portion of said oxygen-containing gas comprises not more than 49% by volume of the total amount of said oxygen-containing gas injected into said culture medium and said major portion of said oxygen-containing gas comprises at least 51% by volume of the total amount of said oxygen-containing gas injected into said culture medium.

3. The process of claim 1 wherein said minor portion of said oxygen-containing gas comprises about 5% by volume of the total amount of said oxygen-containing gas injected into said culture medium and said major portion of said oxygen-containing gas comprises about 95% by volume of the total amount of said oxygen-containing gas.

4. The process of claim 1 wherein said minor portion of said oxygen-containing gas is injected into said culture medium proximate the bottom portion thereof.

5. The process of claim 1 wherein said major portion of said oxygen-containing gas is injected into said culture medium at a depth of from 1 to 6 inches below the surface of said culture medium.

6. The process of claim 1 wherein said major portion of said oxygen-containing gas is injected into said culture medium at a depth of about 1 inch below the surface of said culture medium.

7. The process of claim 1 wherein said minor portion of said oxyvgen-containing gas is injected into said culture medium at a pressure not greater than 5 p.s.i.g.

8. The process of claim 1 wherein said major portion of said oxygen-containing gas is injected into said culture medium at a pressure not greater than 30 p.s.i.g.

9. The process of claim 1 wherein said major portion of said oxygen-containing gas is injected into said culture medium at a pressure at least 0.5 p.s.i.g. less than the pressure at which said minor portion of said oxygen-containing gas is injected into said culture medium.

10. The process of claim 1 wherein said oxygen-containing gas is air.

11. The process of claim 1 wherein said oxygen-containing gas of step (b) is oxygen-enriched air.

12. The process of claim 1 wherein in step (b) said oxygen-containing gas is at a temperature of 32° F. to 80° F.

13. The process of claim 1 wherein in step (b) said oxygen-containing gas is at a temperature of about 72° F. and said gas and gases removed in step (d) are at a temperature of about 98° F.

14. The process of claim 1 wherein in step (e) the water temperature is from 32° F. to 80° F.

15. The process of claim 1 wherein in step (e) said gas and gases of step (d) are at a temperature of about 98° F. and the water temperature is about 70° F.

References Cited

UNITED STATES PATENTS 2,911,205   11/1959   Kraus _____ 261—122

ALVIN E. TANENHOLTZ, Primary Examiner

U.S. Cl. X.R.

261—122; 195—142, 28 R